May 2, 1961 C. L. McCLINTOCK 2,982,261
AIR ENGINE
Filed July 7, 1958 2 Sheets-Sheet 1

CLEO L. McCLINTOCK
*INVENTOR.*

BY

May 2, 1961 C. L. McCLINTOCK 2,982,261
AIR ENGINE
Filed July 7, 1958 2 Sheets-Sheet 2

CLEO L. McCLINTOCK
INVENTOR.

BY James L. Givnan
ATTY ized May 2, 1961

2,982,261
AIR ENGINE

Cleo L. McClintock, Portland, Oreg., assignor to Edward M. Nelson, Colton, Oreg.

Filed July 7, 1958, Ser. No. 746,757

1 Claim. (Cl. 121—58)

This invention relates to improvements in engines and more particularly to an engine operated by fluid pressure and the expansion forces thereof at operating temperatures of the engine.

The objects and advantages of the invention will become apparent as the description proceeds and that the invention consists essentially in the novel combination and arrangement of parts hereinafter described in detail and illustrated in the accompanying drawings.

Figure 1:
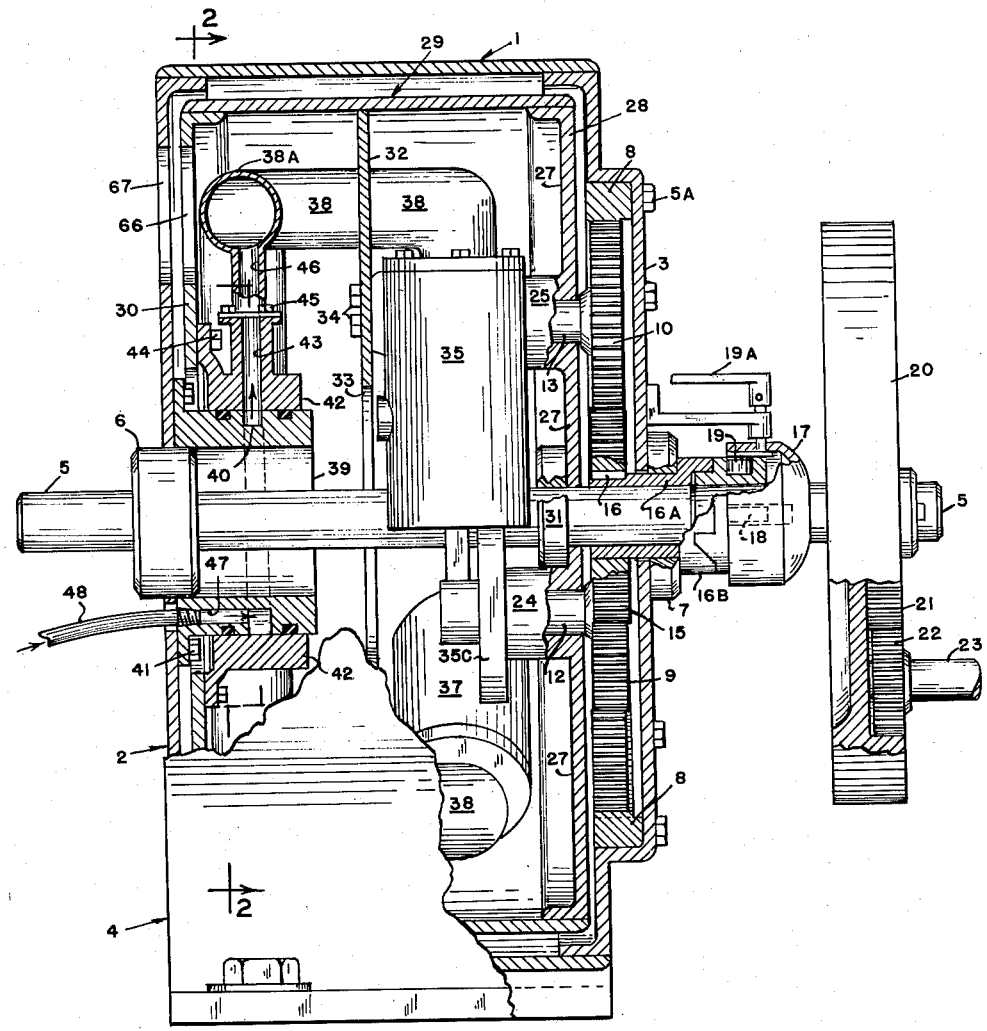
Figure 1 is a side view of an engine made in accordance with my invention and with fragments broken away and some parts in section for convenience of illustration.

Referring now more particularly to the drawings:

In the preferred embodiment of the features of my invention as here shown, reference numeral 1 indicates a stationary cylindrical housing closed at both of its ends by end walls 2 and 3 and provided with suitable supporting legs indicated generally at 4. An engine shaft 5 extends entirely through the housing 1 and is journaled in anti-friction bearings 6 and 7 secured to the end walls 2 and 3 respectively of the housing 1. Secured as at 5A to the end wall 3 is an internal ring gear 8 enmeshed at all times with three planet gears 9, 10 and 11, secured to one end of shafts 12, 13 and 14, respectively. The planet gears are enmeshed at all times with a sun gear 15 keyed or otherwise secured as at 16 to the inner end of a sleeve 16A freely rotatable about the engine shaft 5. The opposite or outer end of the sleeve terminates in a clutch element 16B cooperating with a manually disengageable companion clutch element 17 slidably splined as at 18 to the engine shaft 6 and operable into and out of engagement with the clutch element 16B by any approved type of actuating mechanism such as the rollers 19 and handle 19A. The outer end of the engine shaft is provided with a flywheel 20. The inner periphery of the flywheel is cast integral with or provided with an internal ring gear 21 meshing at all times with a driving gear 22 secured to one end of a shaft 23 of a starting motor (not shown).

The shafts 12, 13 and 14 of the planet gears are rotatably mounted in bearings respectively 24, 25 and 26, formed in a carrier 27 in the form of a disc which provides one end wall 28 of a cylindrical housing 29 disposed within the main housing 1 closed by an opposing end wall 30 and freely rotatable about the engine shaft 5 by means of anti-friction bearings 31.

An intermediate wall 32 is secured within the cylindrical housing 29 and is provided with a central concentric opening 33. Securely mounted as at 34 to the wall 32 are three motor cylinders 35, 36 and 37, each provided, respectively, with pistons 35A, 36A and 37A operatively mounted therein. The pistons are connected by their pitmans 35B, 36B and 37B to crank discs 35C, 36C and 37C. The crank discs are secured to or formed integral with the shafts 12, 13 and 14, respectively, of the planet gears 9, 10 and 11.

The head of each cylinder is provided with a conduit 38 extending through the wall 32 and in open communication with an annular tubular pressure manifold 38A. A hub 39 having a circumferential groove 40 therein is secured as at 41 to the housing wall 2 and partially supports the bearing 6. A ring 42, ported as at 43, is secured as at 44 to and rotatable with the wall 30 of the rotatable housing 29. The port 43 is connected as at 45 to and in communication with the manifold 38A by means of a duct 46. The bottom of the ring 42 is ported as at 47 and thereby in communication by means of a pressure line 48 with a source of fluid pressure (not shown).

The head of each cylinder 35, 36 and 37 is provided with a centrally disposed poppet valve 50 seated as at 51 and provided with a stem 52 extending downwardly into its respective cylinder whereby each valve will be intermittently opened by contact with the top of its respective piston as the piston nears the completion of its up-stroke.

Figure 2:
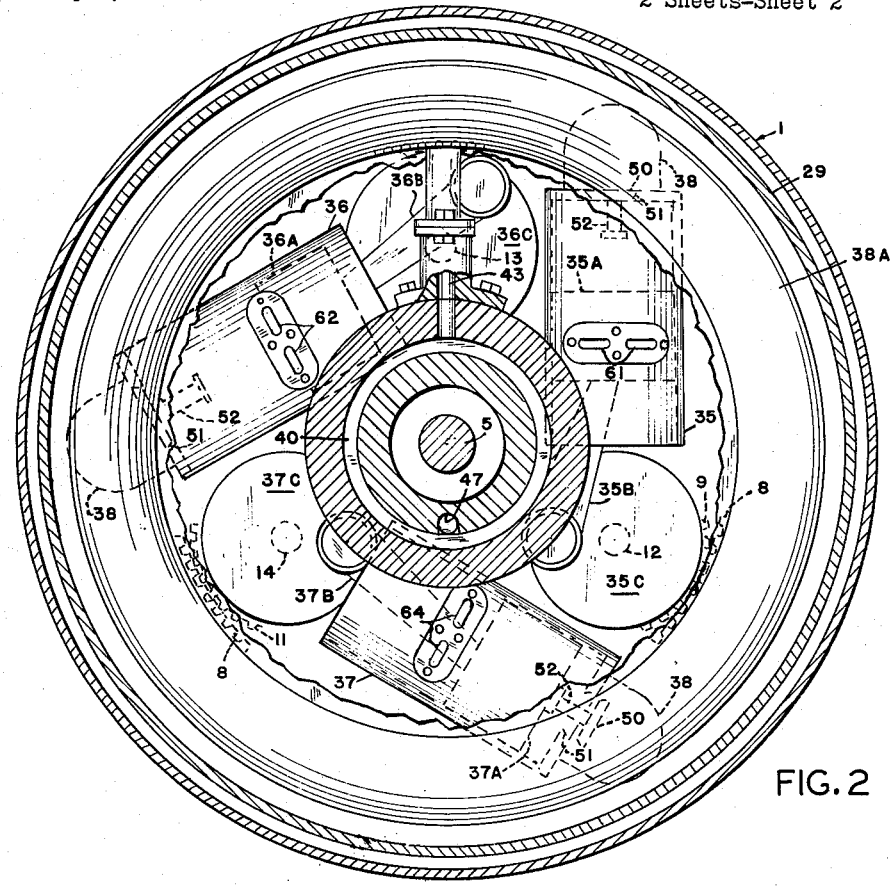
Figure 2 is a sectional end view taken approximately along the line 2—2 of Figure 1.
Figure 3:
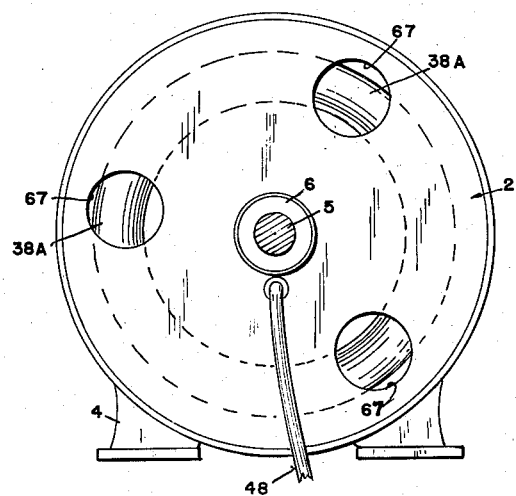
Figure 3 is a view on a reduced scale of the left end of Figure 1.

With the parts in their positions shown in Figure 2, the piston 37A of cylinder 37 is starting its downward or power stroke; piston 36A in cylinder 36 is starting its upward stroke, and piston 35A in cylinder 35 is substantially midway of its power stroke. Pressure from the main manifold 38A through the conduits 38 is fed progressively and automatically to the cylinders 35, 36 and 37 by the opening of their intake valves 50. Since the cylinders and their respective pistons and valves are identical, as is also their operation, a description of one will suffice for all. For example, and with particular reference to cylinder 37 it will be seen that as piston 37A (assuming it is now arriving at the top of its stroke) strikes the valve stem 52, the valve 50 will be lifted from its seat to admit into the cylinder a full charge of pressure from the conduit 38. As the piston starts its downward stroke, the valve 50 will close, allowing the piston to complete its power stroke, at the end of which the residual pressure will exhaust through the ports 64.

In the end wall 30 of the internal cylindrical rotatable housing 29 I provide one or more exhaust openings 66 open to the atmosphere through one or more openings 67 formed in the end wall 2 of the stationary main housing 1.

From the foregoing it will be apparent that actual transmission of power by air from the main manifold to the motor cylinders at high velocity and with very slight loss by friction and the magnitude of forces created by the lever advantages between the pistons of the motor cylinders, planet gears, planet carrier, sun gear, and engine shaft are simple and effective and that since air develops heat on compression, the resultant expansion forces of the air within the motor cylinders will augment the power output generated by their mechanical operation.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

An engine comprising a stationary cylindrical main housing closed at both of its ends by end walls, an engine shaft rotatably mounted within and extending to the exterior of the housing, a rotatable cylindrical housing disposed within the main housing concentric with the engine shaft and closed at both of its ends by end walls, and provided with an intermediate wall, one of said last mentioned end walls comprising a planet carrier, a plurality of planet gears rotatably attached to the planet carrier by their shafts extending therethrough, a sleeve rotatable about said engine shaft extending to the interior of said housing and provided on its inner end with a sun gear at all times enmeshed with said planet gears, a plurality of motor cylinders fixedly secured to said planet carrier and to said intermediate wall for rotation with said rotatable housing and having pistons therein operatively connected to said planet gears, each of said cylinders closed at its outer end by a cylinder head and having a permanent exhaust opening intermediate its ends adapted to be closed by its respective piston during the down-stroke thereof and opened by the passage of the piston in completion of the down-stroke, an annular tubular fluid pressure manifold in open communication with the interior of said cylinders through said cylinder heads thereof, a hub secured to the main housing, surrounding said engine shaft and having a circumferential groove therein, fluid pressure inlet means at all times in open communication with said groove, a ring secured to said rotatable housing and rotatable about said hub, said ring having a port therein at all times in open communication with said fluid pressure manifold, valve means centrally disposed in and extending through said cylinder heads at the communicating end of said manifold with said cylinders, and each of said valve means having a stem terminating within its respective cylinder and adapted thereby to be opened by its respective piston as the piston nears the completion of its upstroke to thereby admit pressure from the manifold to the interior of its respective cylinder at the beginning of the piston power stroke, and an internal ring gear rigidly secured to one of said end walls of the main housing and surrounding said planet gears and constantly enmeshed therewith whereby one revolution of the planet carrier will impart three revolutions to the engine shaft.

References Cited in the file of this patent

UNITED STATES PATENTS

| | | |
|---|---|---|
| 507,989 | Brunler | Nov. 7, 1893 |
| 653,040 | Royse | July 3, 1900 |
| 975,486 | Waltman | Nov. 15, 1910 |

FOREIGN PATENTS

| | | |
|---|---|---|
| 162,652 | Great Britain | July 20, 1922 |

UNITED STATES PATENT OFFICE
CERTIFICATION OF CORRECTION

May 2, 1961

Patent No. 2,982,261

Cleo L. McClintock

It is hereby certified that error appears in the above numbered patent requiring correction and that the said Letters Patent should read as corrected below.

In the grant, line 2, for "assignor to Edward M. Nelson, of Colton, Oregon," read -- assignor of one-third to Edward M. Nelson, and one-third to Bill J. Whitley, both of Colton, Oregon, --; line 11, for "Edward M. Nelson, his heirs" read -- Cleo L. McClintock, Edward M. Nelson, and Bill J. Whitley, their heirs --; in the heading to the printed specification, lines 3 and 4, for "assignor to Edward M. Nelson, Colton, Oreg." read -- assignor of one-third to Edward M. Nelson, and one-third to Bill J. Whitley, both of Colton, Oreg. --.

Signed and sealed this 31st day of October 1961.

(SEAL)
Attest:

ERNEST W. SWIDER
Attesting Officer

DAVID L. LADD
Commissioner of Patents